US012174937B2

(12) United States Patent
Cambric et al.

(10) Patent No.: US 12,174,937 B2
(45) Date of Patent: Dec. 24, 2024

(54) SYSTEMS AND METHODS FOR DETECTING ANOMALOUS POST-AUTHENTICATION BEHAVIOR WITH RESPECT TO A USER IDENTITY

(71) Applicant: Microsoft Technology Licensing, LLC, Redmond, WA (US)

(72) Inventors: Shinesa Elaine Cambric, Sachse, TX (US); Maria Puertas Calvo, Seattle, WA (US); Ye Xu, Kirkland, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 314 days.

(21) Appl. No.: 17/670,105

(22) Filed: Feb. 11, 2022

(65) Prior Publication Data

US 2023/0262072 A1    Aug. 17, 2023

(51) Int. Cl.
*G06F 21/45* (2013.01)
*G06F 21/55* (2013.01)
*G06N 3/04* (2023.01)

(52) U.S. Cl.
CPC ............ *G06F 21/45* (2013.01); *G06F 21/554* (2013.01); *G06N 3/04* (2013.01)

(58) Field of Classification Search
None
See application file for complete search history.

(56) References Cited

U.S. PATENT DOCUMENTS 11,010,233 B1 * 5/2021 Golden ................. G06F 21/554
11,593,639 B1 * 2/2023 Garg ................... G06F 18/2415
11,888,870 B2 * 1/2024 Garyani ............... H04L 63/1441
2020/0128047 A1   4/2020 Biswas et al.
2020/0213338 A1   7/2020 Lotem et al.
2020/0412717 A1  12/2020 Puertas Calvo et al.
2022/0030019 A1 * 1/2022 Neuvirth .............. H04L 63/1425
2022/0391198 A1 * 12/2022 Decrop ................... H04L 51/02

OTHER PUBLICATIONS

Deep dive into the Solorigate second-stage activation: From Sunburst to Teardrop and Raindrop, Retrieved From <<https://www.microsoft.com/security/blog/2021/01/20/deep-dive-into-the-solorigate-second-stage-activation-from-sunburst-to-teardrop-and-raindrop/>>, Jan. 20, 2021, 33 Pages.
"International Search Report and Written Opinion Issued in PCT Application No. PCT/US23/010531", Mailed Date: Apr. 3, 2023, 11 Pages.

* cited by examiner

*Primary Examiner* — Jeffrey R Swearingen
(74) *Attorney, Agent, or Firm* — Weaver IP L.L.C.

(57) ABSTRACT

Methods, systems, apparatuses, and computer-readable storage mediums described herein are configured to detect anomalous post-authentication behavior with respect to a user identity. For example, one or more audit logs that specify a plurality of actions performed with respect to the user identity of a platform-based identity service, while the user identity is authenticated with the platform-based identity service, are analyzed. The audit log(s) are analyzed via an anomaly prediction model that generates an anomaly score indicating a probability whether a particular sequence of actions of the plurality of actions is indicative of anomalous behavior. A determination is made that an anomalous behavior has occurred based on the anomaly score. In response to determining that anomalous behavior has occurred, a mitigation action may be performed that mitigates the anomalous behavior.

20 Claims, 7 Drawing Sheets

SYSTEMS AND METHODS FOR DETECTING ANOMALOUS POST-AUTHENTICATION BEHAVIOR WITH RESPECT TO A USER IDENTITY

BACKGROUND

Cloud computing platforms offer higher efficiency, greater flexibility, lower costs, and better performance for applications and services relative to "on-premises" servers and storage. Accordingly, users are shifting away from locally maintaining applications, services, and data and migrating to cloud computing platforms. This migration has gained the interest of malicious entities, such as hackers. Hackers attempt to gain access to valid cloud subscriptions and user accounts in an attempt to steal and/or hold ransom sensitive data or leverage the massive amount of computing resources for their own malicious purposes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums described herein are configured to detect anomalous post-authentication behavior with respect to a user identity. For example, one or more audit logs that specify a plurality of actions performed with respect to the user identity of a platform-based identity service, while the user identity is authenticated with the platform-based identity service, are analyzed. The audit log(s) are analyzed via an anomaly prediction model that generates an anomaly score indicating a probability whether a particular sequence of actions of the plurality of actions is indicative of anomalous behavior. A determination is made that an anomalous behavior has occurred based on the anomaly score. In response to determining that anomalous behavior has occurred, a mitigation action may be performed that mitigates the anomalous behavior.

Further features and advantages, as well as the structure and operation of various example embodiments, are described in detail below with reference to the accompanying drawings. It is noted that the example implementations are not limited to the specific embodiments described herein. Such example embodiments are presented herein for illustrative purposes only. Additional implementations will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate example embodiments of the present application and, together with the description, further serve to explain the principles of the example embodiments and to enable a person skilled in the pertinent art to make and use the example embodiments.

Figure 1:
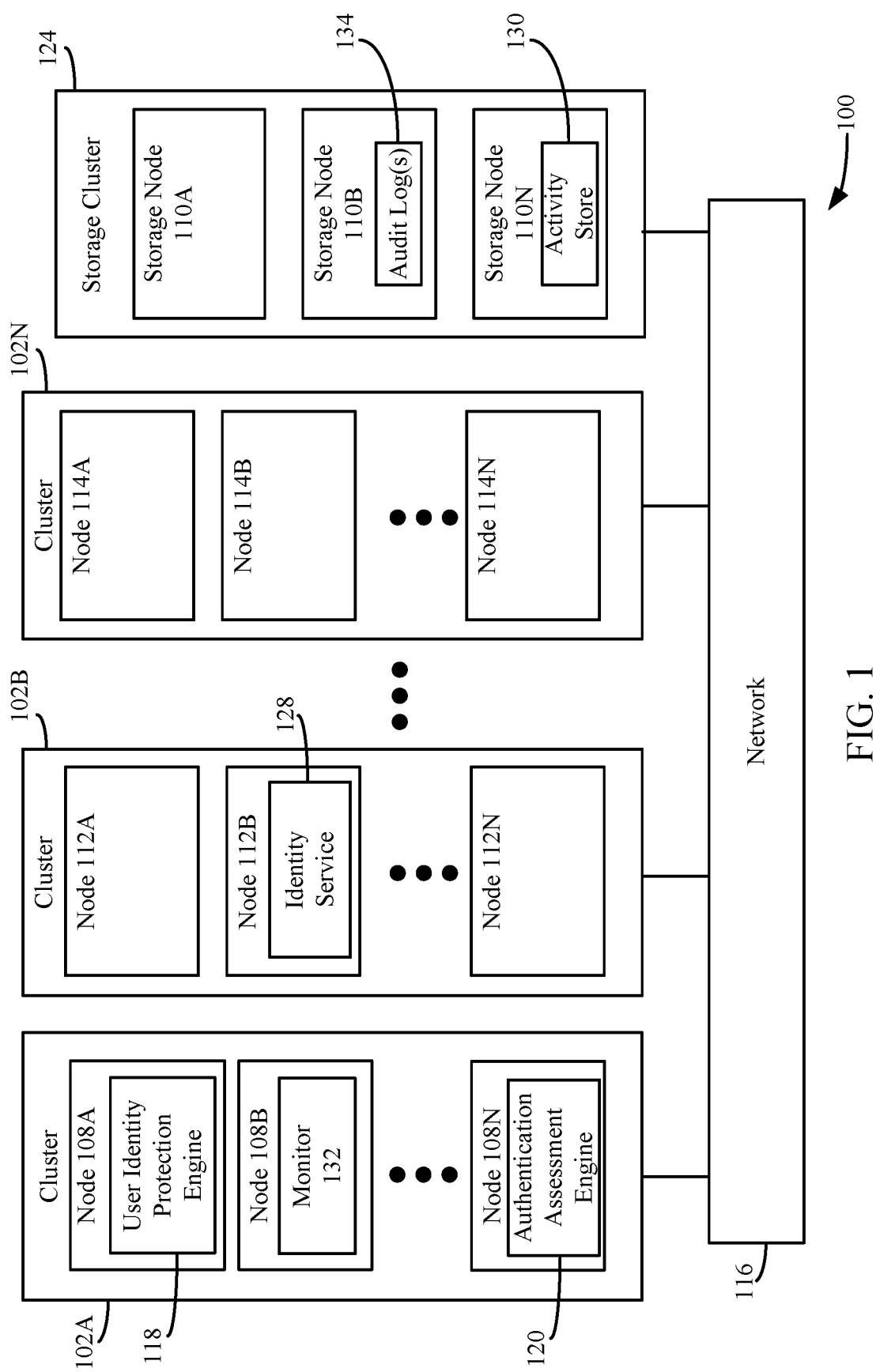
FIG. 1 shows a block diagram of an example network-based computing system configured to detect anomalous post-authentication behavior with respect to a user identity in accordance with an example embodiment.

The features and advantages of the implementations described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose numerous example implementations. The scope of the present application is not limited to the disclosed implementations, but also encompasses combinations of the disclosed implementations, as well as modifications to the disclosed implementations. References in the specification to "one implementation," "an implementation," "an example embodiment," "example implementation," or the like, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of persons skilled in the relevant art(s) to implement such feature, structure, or characteristic in connection with other implementations whether or not explicitly described.

In the discussion, unless otherwise stated, adjectives such as "substantially" and "about" modifying a condition or relationship characteristic of a feature or features of an implementation of the disclosure, should be understood to mean that the condition or characteristic is defined to within tolerances that are acceptable for operation of the implementation for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous example embodiments are described as follows. It is noted that any section/subsection headings provided herein are not intended to be limiting. Implementations are described throughout this document, and any type of implementation may be included under any section/subsection. Furthermore, implementations disclosed in any section/subsection may be combined with any other implementations described in the same section/subsection and/or a different section/subsection in any manner.

II. Example Implementations

Embodiments described herein are directed to detecting anomalous post-authentication behavior with respect to a user identity. For example, one or more audit logs that specify a plurality of actions performed with respect to the user identity of a platform-based identity service, while the user identity is authenticated with the platform-based identity service, are analyzed. The audit log(s) are analyzed via an anomaly prediction model that generates an anomaly score indicating a probability whether a particular sequence of actions of the plurality of actions is indicative of anomalous behavior. A determination is made that an anomalous behavior has occurred based on the anomaly score. In response to determining that anomalous behavior has occurred, a mitigation action may be performed that mitigates the anomalous behavior.

The embodiments described herein provide improvements in other technologies, namely data security. For instance, the techniques described herein advantageously mitigate anomalous (e.g., malicious) accesses to resources (e.g., web applications, web services, user accounts, etc.) that occur, for example, via a user identity that was successfully authenticated, thereby mitigating access to personal and/or confidential information associated with the resource, as well mitigating access to the network and computing entities (e.g., computing devices, virtual machines, etc.) on which the resource is provided. In addition, by mitigating the access to such computing entities, the unnecessary expenditure of compute resources (e.g., CPUs, storage devices, memory, power, etc.) associated with such entities is also mitigated. Accordingly, the embodiments described herein also improve the functioning of the computing entity on which such compute resources are utilized/maintained, as such compute resources are conserved as a result from preventing a malicious entity from utilizing such compute resources, e.g., for nefarious purposes.

For example, FIG. 1 shows a block diagram of an example network-based computing system 100 configured to detect anomalous post-authentication behavior with respect to a user identity, according to an example embodiment. As shown in FIG. 1, system 100 includes a plurality of clusters 102A, 102B and 102N and a storage cluster 124. Each of clusters 102A, 102B and 102N and storage cluster 124 are communicatively coupled to each other via network 116. Network 116 may comprise one or more networks such as local area networks (LANs), wide area networks (WANs), enterprise networks, the Internet, etc., and may include one or more of wired and/or wireless portions.

Clusters 102A, 102B and 102N and/or storage cluster 124 may form a network-accessible server set (e.g., a cloud-based environment or platform). Each of clusters 102A, 102B and 102N may comprise a group of one or more nodes (also referred to as compute nodes) and/or a group of one or more storage nodes. For example, as shown in FIG. 1, cluster 102A includes nodes 108A-108N, cluster 102B includes nodes 112A-112N, and cluster 102N includes nodes 114A-114N. Each of nodes 108A-108N, 112A-112N and/or 114A-114N are accessible via network 116 (e.g., in a "cloud-based" embodiment) to build, deploy, and manage applications and services. Storage cluster 124 comprises one or more storage nodes 110A-110N. Each of storage node(s) 110A-110N comprises a plurality of physical storage disks that are accessible via network 116 and is configured to store data associated with the applications and services managed by nodes 108A-108N, 112A-112N, and/or 114A-114N.

In an embodiment, one or more of clusters 102A, 102B and 102N and/or storage cluster 124 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 102A, 102B and 102N and/or storage cluster 124 may be a datacenter in a distributed collection of datacenters.

Each of node(s) 108A-108N, 112A-112N and 114A-114N may comprise one or more server computers, server systems, and/or computing devices. Each of node(s) 108A-108N, 112A-112N and 114A-114N may be configured to execute one or more software applications (or "applications") and/or services and/or manage hardware resources (e.g., processors, memory, etc.), which may be utilized by users (e.g., customers) of the network-accessible server set. Node(s) 108A-108N, 112A-112N and 114A-114N may also be configured for specific uses. For example, as shown in FIG. 1, node 108A may be configured to execute a user identity protection engine 118, node 108N may be configured to execute an authentication assessment engine 120, and node 112B may be configured to execute a identity service 128. It is noted that instances of user identity protection engine 118, authentication assessment engine 120, and/or identity service 128 may be executing on other node(s) (e.g., node(s) 108B-108N, node(s) 112A-112N, and/or node(s) 114A-114N) in lieu of or in addition to nodes 108A, 108N, 112B and 108B, respectively. It is further noted that one or more of user identity protection engine 118, authentication assessment engine 120, and/or identity service 128 may be incorporated with each other.

Identity service 128 may be configured to maintain a plurality of user identities by which associated users may utilize to access one or more devices, web applications and/or web services maintained by system 100 (e.g., web application and/or services hosted and/or executed by any of node(s) 108A-108N, node(s) 112A-112N, and/or node(s) 114A-114N) and/or associated with identity service 128. For example, each user identity may be associated with a user that is able to be authenticated via authentication credentials (e.g., a username and password) associated therewith. When a user signs into a device, web application or web service associated with identity service 128, the authentication credentials are provided to identity service 128. Identity service 128 may prompt the user to enter authorization credentials. Identity endpoint 106 verifies the user identity of the user by validating the authorization credentials. In response to a successful validation, the user is provided access to the device, web application or web service. An example of identity service 128 includes, but is not limited to, Microsoft® Azure Active Directory™ published by Microsoft® Corp.

Authentication assessment engine 120 may be configured to monitor the authentication process and assess whether the credentials utilized to authenticate a user identity were compromised. For instance, authentication assessment engine 120 may be configured to perform behavior tracking, where certain authentication-related features and/or characteristics of a plurality of users are tracked. Such characteristics may be stored in an activity store 130 maintained by one of storage nodes 110A-110N (e.g., storage node 110N). Activity store 130 may store an entry for each user being tracked. Each entry of a user may comprise a list of authentication features associated with the user. Examples of authentication features include, but are not limited to, IP (Internet Protocol)-related features (e.g., an IP address utilized during an authentication process, an autonomous system number (ASN), which indicates the organization that owns the IP, a location (e.g., a latitude/longitude pair) that indicates the geographical location of the IP address, etc.), a device utilized during the authentication process, a tenant IP subnet associated with the authentication process (e.g., a calculated feature where/24 IP subnets are associated to the user's tenant as likely being corporate IPs), an EAS (Exchange ActiveSync) device associated with the authentication process, a browser ID of a browser utilized during an authentication process (e.g., an identifier for a persistent cookie stored in the user's device by the browser), etc. It is noted that the authentication features described herein are purely exemplary and that other features may also be utilized.

For each of the features stored in activity store 130, the following information is stored: the number of times the user has authenticated with the feature, the frequency the user has authenticated with that feature, the standard deviation of the frequency the user has authenticated with the feature, and the timestamp of the last time the user authenticated with last feature. The count, frequency, standard deviation and timestamp for each feature may be periodically recomputed and stored in activity store 130.

Authentication assessment engine 120 may be further configured to perform feature matching. Every time a user authenticates successfully with a device, web application or web service, the features of the authentication are extracted and compared to the user's features stored in the activity store 130. For example, the IP address used during the authentication is compared to all the IP addresses associated with the user that are stored in activity store 130. If the feature is found in activity store 130, a match pattern is computed. The match pattern for the feature may be based on an analysis of the count, frequency, standard deviation and last seen timestamp that are stored for that feature in activity store 130. Based on this analysis, a feature match can be considered frequent active, frequent inactive, occasional active, occasional inactive or rare. A match pattern of frequent active for a particular feature means that the user frequently authenticates and has recently authenticated with that feature. A match pattern of frequent inactive for a particular feature means that the user frequently authenticates and has not recently authenticated with that feature. A match pattern of occasional active for a particular feature means that the user occasionally authenticates and has recently authenticated with that feature. A match pattern of occasional inactive for a particular feature means that the user occasionally authenticates and has not recently authenticated with that feature. A match pattern of rare means that the user rarely has authenticated with that feature. It is noted that other match patterns may also be utilized. If the authentication feature does not match any of the features stored in activity store 130 for that feature type, the feature is considered a no-match.

Authentication assessment engine 120 may be further configured to determine the risk of the authentication based on the match score. For instance, the probability of account compromise is evaluated at different values of the match score. This may be performed based on empirical data collected from known compromised authentications. Once the probability of compromise is determined for every match score, thresholds may be set for detection. For example, a low risk threshold, a medium risk threshold, and a high-risk threshold may be set. The low risk threshold may represent the probability of compromise at that score range is low. The medium risk threshold may represent the probability of compromise at that score range is medium. The high-risk threshold may represent the probability of compromise at that score range is high. The thresholds may be set based on the match scores determined for the distribution of users. When an authentication process occurs with respect to a device, web application, and/or web service resource, authentication assessment engine 120 determines the match score and compares it the various risk level thresholds.

Authentication assessment engine 120 may generate and/or output an authentication risk score indicating a probability of whether the user credentials were compromised at the time of authentication. For instance, authentication assessment engine 120 may generate and/or output a first authentication risk score if the match score corresponds to a high risk level threshold, may generate and/or output a second authentication risk score if the match score corresponds to a medium risk level threshold, or may generate and/or output a third authentication risk score if the match score corresponds to a low risk level.

Monitor 132 is configured to monitor actions performed by user identities with respect to identity service 128 after the user identities have been authenticated by and remain authenticated with identity service 128. Such actions include, but are not limited to, creating and/or activating new (or previously-used) user accounts, service principals, groups, cloud-based subscriptions, etc., changing user or group attributes, permission settings, security settings (e.g., multi-factor authentication settings), federation settings, data protection (e.g., encryption) settings, elevating another user account's privileges (e.g., via an admin account), retriggering guest invitation emails, etc. Monitor 132 may also be configured to monitor access to and/or actions taken with respect to web applications, web services, and/or data objects (e.g., managed by such applications and/or services). For example, each time a data object is accessed (e.g., created, opened, closed, modified, deleted, etc.), monitor 132 detects the access. Examples of data objects include, but are not limited to, a data file, a database object (e.g., a table, a directory, etc.), structured data, unstructured data, semi-structured data, a data container, etc.

For each user identity, monitor 132 may be configured to generate a record of the above-described actions performed by the user identity and store the record via one or more audit logs 134, which may be stored in a storage node (e.g., storage node 110B). For each action, audit log(s) 134 may specify an identifier for the action, a time stamp indicating a time at which the action occurred, a network address (e.g., an IP address) from which the action was initiated, a user identity that initiated and/or performed the action, etc. Each audit log of audit log(s) 134 may store a day's worth of actions. However, the embodiments described herein are not so limited, and each audit log of audit log(s) 134 may store multiple days' worth of actions.

User identity protection engine 118 is configured to analyze audit log(s) 134 for a given user identity and determine whether anomalous behavior has occurred with respect to the user identity post-authentication. For instance, user identity protection engine 118 may utilize an anomaly prediction model that analyzes one or more sequences of actions identified by audit log(s) 134, the times at which each of the actions occurred, a duration of time between the actions occurring and/or the IP address from which the actions were initiated and generate an anomaly score based on the analysis. The anomaly prediction model may, for any given action within the sequence(s) of actions, determine a conditional probability that the action in the sequence(s) of actions occurs after one or more other actions from the sequence(s) of actions. For any given sequence, the determined conditional probabilities are aggregated. The resulting probability corresponds to an anomaly score for the given sequence. For a given sequence of action, user identity protection engine 118 may determine whether the determined anomaly score meets a threshold condition. If the threshold condition is met, then user identity protection engine 118 may determine that anomalous behavior has occurred with respect to the user identity being analyzed. If the threshold condition is not met, then user identity protection engine 118 may determine that anomalous behavior has not occurred with respect to the user identity being analyzed.

In accordance with an embodiment, user identity protection engine 118 may also consider the authentication risk score provided by authentication assessment engine 120 when determining whether anomalous behavior has occurred with respect to a user identity. For instance, user identity protection engine 118 may combine the authentication risk score with the anomaly score to generate a combined score. User identity protection engine 118 may determine whether the combined score meets the threshold condition.

In accordance with an embodiment, the threshold condition may be a predetermined value. In accordance with such an embodiment, user identity protection engine 118 may be configured in one of many ways to determine that the threshold condition has been met. For instance, user identity protection engine 118 may be configured to determine that the threshold condition has been met if the anomaly score (or combined score) is less than, less than or equal to, greater than or equal to, or greater than the predetermined value.

In response to determining that anomalous behavior has occurred with respect to the user identity, user identity protection engine 118 may cause a mitigation action to be performed that mitigates the anomalous behavior. For example, user identity protection engine 118 may issue a notification (e.g., to an administrator) that indicates anomalous behavior has been detected, provides a description of the anomalous behavior (e.g., by specifying the actions in the sequence of actions determined to be anomalous, specifying the IP address(es) from which the actions initiated, times at which the actions occurred, etc.), cause the user identity to be removed from identity service 128, cause access to a resource (e.g., a web application, a web service, a data object, etc.) that was previously-accessible by the user identity to be restricted for the user identity. The notification may comprise a short messaging service (SMS) message, a telephone call, an e-mail, a notification that is presented via an incident management service, a security tool (e.g., Microsoft® Defender for Cloud™ published by Microsoft® Corp, Microsoft® Sentinel™ published by Microsoft® Corp., etc.) configured to display security risks, the anomaly score, enable a user to harden resources, change security settings, change permission settings, etc. User identity protection engine 118 may cause a user identity to be removed from identity service 128 by sending a command to identity service 128 that causes identity service 128 to remove the user identity therefrom. User identity protection engine 118 may cause access to a resource to be restricted (e.g., by limiting or preventing access) for the user identity by sending a command to identity service 128 that causes identity service 128 to update access and/or permission settings for the user identity with regards to the resource.

Figure 2:
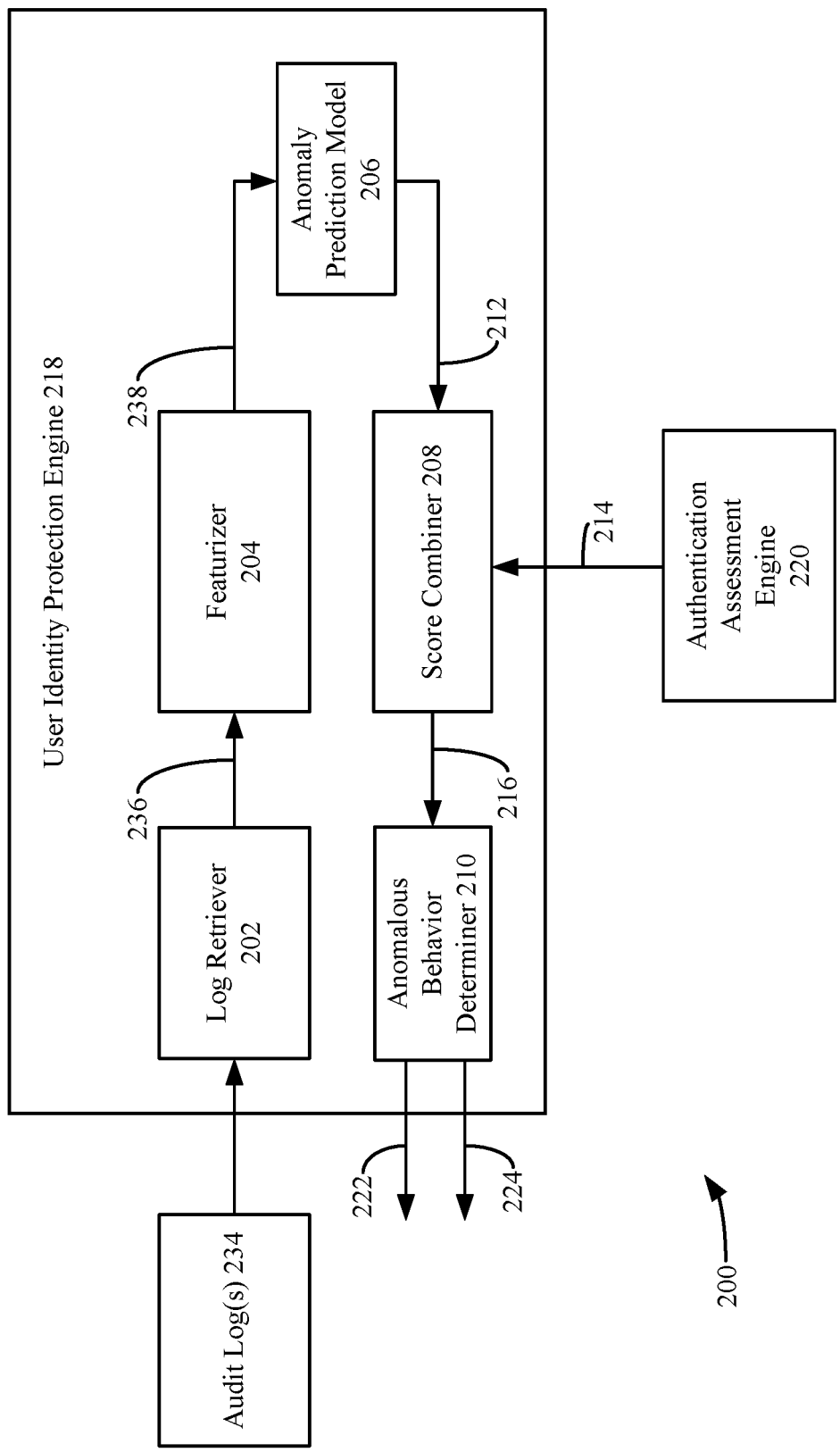
FIG. 2 depicts a block diagram of a system for detecting anomalous post-authentication behavior with respect to a user identity.

FIG. 2 depicts a block diagram of a system 200 for detecting anomalous post-authentication behavior with respect to a user identity, according to an example embodiment. As shown in FIG. 2, system 200 comprises a user identity protection engine 218 and an authentication assessment engine 220. User identity protection engine 218 and authentication assessment engine 220 are examples of user identity protection engine 118 and authentication assessment engine 120, as respectively described above with reference to FIG. 1. User identity protection engine 218 may comprise a log retriever 202, a featurizer 204, an anomaly prediction model 206, a score combiner 208, and an anomalous behavior determiner 210.

Log retriever 202 is configured to retrieve one or more audit logs 234, which are examples of audit log(s) 134, as described above with reference to FIG. 1. Log retriever 202 may be configured to retrieve audit log(s) 234 on a periodic basis (e.g., hourly, daily, weekly, monthly, etc.). However, it is noted that the embodiments described herein are not so limited. For instance, log retriever 202 may be configured to retrieve audit log(s) 234 responsive to receiving a command initiated by a user (e.g., an administrator) or another application. In accordance with an embodiment, log retriever 202 is configured to retrieve the last seven days' worth of audit log(s) 234 (i.e., the audit logs generated in the last seven days). By limiting the audit log(s) 234 that are retrieved, the amount of data to be processed is limited, thereby advantageously conserving compute resources (e.g., processing cycles, memory, storage, etc.). It is noted that log retriever 202 may be configured to retrieve any days' worth of audit log(s) 234 (or any portion thereof). To retrieve audit log(s) 234, log retriever 202 may provide a query to a data store (e.g., a database) that stores audit log(s) 234. The query may specify a user identity and/or a time range for audit log(s) 234 (e.g., the last seven days of audit log(s) 234 for user identity A). The subset of audit logs retrieved (shown as audit log(s) 236) are provided to featurizer 204.

Featurizer 204 may be configured to extract data from audit log(s) 236. The data may include, but is not limited to, an identifier for each action specified by audit log(s) 236, a time stamp indicating a time at which each action occurred, a network address from which each action was initiated, etc. Featurizer 204 may be also configured to generate one or more feature vectors 238 based on the data extracted from audit log(s) 236, which are provided to anomaly prediction model 206. Feature vector(s) 238 generated by featurizer 204 may take any form, such as a numerical, visual and/or textual representation, or may comprise any other form suitable for representing audit log(s) 236. In an embodiment, feature vector(s) 238 may include features such as keywords, a total number of words, and/or any other distinguishing aspects relating to audit log(s) 236 that may be extracted therefrom. Featurizer 204 may operate in a number of ways to featurize, or generate feature vector(s) 238 for, a given audit log of audit log(s) 236. For example and without limitation, featurizer 204 may featurize a given audit log of audit log(s) 236 through time series analysis, keyword featurization, semantic-based featurization, digit count featurization, and/or n-gram-TFIDF featurization.

Anomaly prediction model 206 may be a machine learning model that is configured to receive feature vector(s) 238. For example, anomaly prediction model 206 may be configured to analyze one or more sequences of actions, the times at which each of the actions occurred, a duration of time between the actions occurring and/or the IP address from which the actions were initiated as (identified by audit log(s) 236 and represented by feature vector(s) 238) and generate an anomaly score 212 based on the analysis. For example, anomaly prediction model 206 may, for any given action within the sequence(s) of actions, determine a conditional probability that the action in the sequence(s) of actions occurs after one or more other actions from the sequence(s) of actions. As described below with reference to FIGS. 7 and 8, the probability is determined based on a training process that is performed for anomaly prediction model 206, where historical audit logs generated for a plurality of user identities are analyzed to determine relationships between actions performed therefor (e.g., the likelihood that a particular action occurs after another action for a user identity that does not exhibit anomalous behavior, the likelihood that a particular action occurs after another action for a user identity that exhibits anomalous behavior, etc.). For any given sequence, the determined conditional probabilities are aggregated. The resulting probability corresponds to anomaly score 212 for the given sequence. It is noted that while the embodiments described with reference to FIG. 2 are directed to machine learning model-based anomaly prediction model 206, the embodiments described herein are not so limited. For instance, anomaly prediction model 206 may be configured to utilize statistical modeling-based techniques (e.g., linear regression-based statistical modeling techniques, logistic regression-based statistical modeling techniques, re-sampling-based statistical modeling techniques, etc.).

Figure 3:
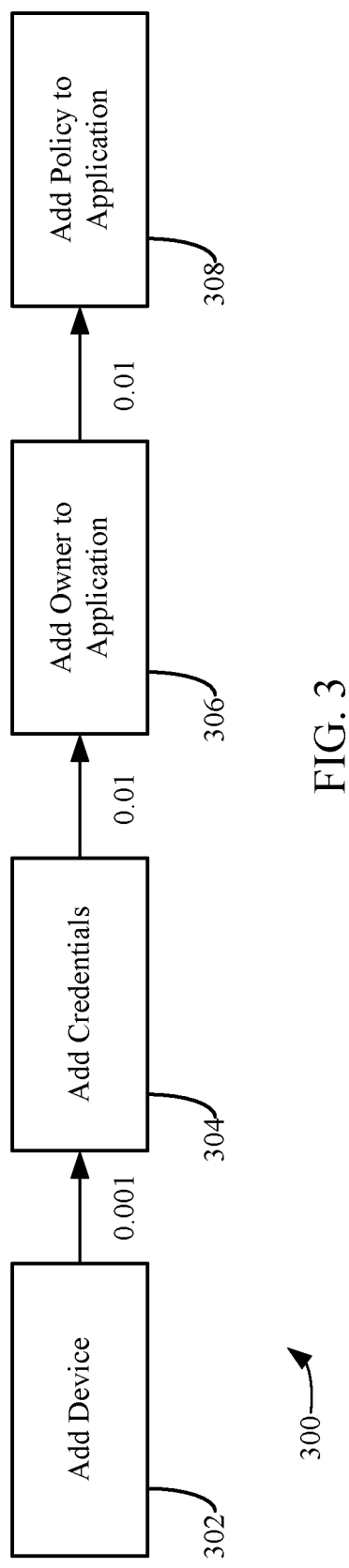
FIG. 3 depicts a flow diagram illustrating a sequence of actions performed with respect to a particular user identity in accordance with an example embodiment.

FIG. 3 depicts a flow diagram illustrating a sequence 300 of actions 302, 304, 306, and 308 performed with respect to a particular user identity in accordance with an example embodiment. As shown in FIG. 3, four actions 302, 304, 306, and 308 are shown, where action 304 occurs after action 302, action 306 occurs after action 304, and action 308 occurs after action 306. It is noted that a sequence may comprise any number of actions and that four actions are shown for the sake of brevity.

As shown in FIG. 3, action 302 corresponds to an action in which a device (e.g., a smart phone, a laptop, a desktop, etc.) has been added for a particular user identity. Action 304 corresponds to an action in which user credentials are added for the user identity. Action 306 corresponds to an action in which an application owner has been added to an application associated with the user identity. Action 308 corresponds to an action in which a policy (e.g., an access policy, a security policy, etc.) has been added to an application associated with the user identity.

Anomaly prediction model 206 may analyze actions 302 and 304 and generate a probability value indicative of the probability (or likelihood) that action 304 occurs after action 302 given that action 302 was the preceding action. As shown in FIG. 3, anomaly prediction model 206 generates a probability value of 0.001 with respect to actions 302 and 304, where lower the probability value, the less likely that a particular action should have occurred after another particular action. In this particular example, adding credentials after adding a device is not typical for a user identity. Accordingly, a low probability value is generated.

Anomaly prediction model 206 then analyzes actions 304 and 306 and generates a probability value indicative of the probability (or likelihood) that action 306 occurs after action 304 (and/or action 302) given that action 304 (and/or action 302) were the preceding action(s). As shown in FIG. 3, anomaly prediction model 206 generates a probability value of 0.01 with respect to actions 306 and 304.

Anomaly prediction model 206 then analyzes actions 306 and 308 and generates a probability value indicative of the probability (or likelihood) that action 308 occurs after action 306 (and/or actions 302 and 304) given that action 306 (and/or actions 302 and/or 304) were the preceding action(s). As shown in FIG. 3, anomaly prediction model 206 generates a probability value of 0.01 with respect to actions 308 and 306.

After generating all the probabilities for a particular sequence of actions (e.g., sequence 300), anomaly prediction model 206 may aggregate the probabilities to generate an anomaly score 212 (also referred to as aggregated anomaly score 212), which may be provided to score combiner 208. Anomaly prediction model 206 may aggregate the probabilities in accordance with Equation 1, which is provided below:

$$\text{Aggregated Anomaly Score} = \frac{-\Sigma_i \log(Prob_i)}{n} \quad \text{(Equation 1)}$$

where i represents a given action (e.g., action 302, 304, 306, or 308) and n represents the total number of actions in the sequence (e.g., sequence 300). In the example shown in FIG. 3, n is equal to 4, and the resulting aggregated anomaly score is 1.75.

Score combiner 208 may be configured to combine aggregated anomaly score 212 with an authentication risk score 214 provided by authentication assessment engine 220 to generate a combined score 216. Authentication risk score 214 may indicate a probability of whether user credentials associated with the user identity being analyzed were compromised at the time of authentication. This way, user identity protection engine 218 considers operations that occurred both during authentication and post-authentication to determine whether anomalous behavior is occurring or has occurred with respect to a particular user identity. In accordance with an embodiment, score combiner 208 may add aggregated anomaly score 212 with authentication risk score 214 to generate combined score 216. Combined score 216 is provided to anomalous behavior determiner 210.

Anomalous behavior determiner 210 may be configured to determine whether combined score 216 meets a threshold condition. If the threshold condition is met, then anomalous behavior determiner 210 may determine that anomalous behavior has occurred with respect to the user identity being analyzed. If the threshold condition is not met, then anomalous behavior determiner 210 may determine that anomalous behavior has not occurred with respect to the user identity being analyzed.

In accordance with an embodiment, the threshold condition may be a predetermined value. In accordance with such an embodiment, anomalous behavior determiner 210 may be configured in one of many ways to determine that the threshold condition has been met. For instance, anomalous behavior determiner 210 may be configured to determine that the threshold condition has been met if the combine score 216 is less than, less than or equal to, greater than or equal to, or greater than the predetermined value.

In response to determining that anomalous behavior has occurred with respect to the user identity, anomalous behavior determiner 210 may cause a mitigation action to be performed that mitigates the anomalous behavior. For example, anomalous behavior determiner 210 may issue a notification 222 (e.g., to an administrator) that indicates anomalous behavior has been detected, provides a description of the anomalous behavior (e.g., by specifying the actions in the sequence of actions determined to be anomalous, specifying the IP address(es) from which the actions initiated, times at which the actions occurred, etc.), cause the user identity to be removed from an identity service (e.g., identity service 128, as described above with reference to FIG. 1), cause access to a resource (e.g., a web application, a web service, a data object, etc.) that was previously-accessible by the user identity to be restricted for the user identity. The notification may comprise a short messaging service (SMS) message, a telephone call, an e-mail, a notification that is presented via an incident management service, a security tool (e.g., Microsoft® Defender for Cloud™ published by Microsoft® Corp of Redmond, Washington, Microsoft® Sentinel™ published by Microsoft® Corp., etc.) configured to display security risks, the anomaly score, and/or enable a user to harden resources, etc. Anomalous behavior determiner 210 may cause a user identity to be removed from the identity service by sending a command 224 to identity service that causes the identity service to remove the user identity therefrom. Anomalous behavior determiner 210 may cause access to a resource to be restricted (e.g., by limiting or preventing access) for the user identity by sending command 224 to the identity service that causes the identity service to update access and/or permission settings for the user identity with regards to the resource. Alternatively, the security tool that receives notification 222 may provide one or more options that enable a user to initiate any of the mitigation actions described herein.

The foregoing techniques are able to detect a variety of different post-authentication anomalous behavior. For instance, such techniques may detect whether certain users (e.g., privileged users) changed federation settings or domains, whether an administrator consented to permissions on behalf of a tenant of a cloud-based platform, whether an administrator consented to certain permission grants, whether a scope (e.g., a regional scope) of an administrative unit of identity service 128 (that restricts permissions in a role to a certain portion of an organization) is changed, whether a user identity is viewing other user or group attributes (such as permission grants) or updating credentials, whether a user identity is viewing sensitive documents or downloading certain files or a large number of files, whether a user identity is viewing downloading, exporting identity related information, whether a user identity is creating new user accounts, groups, or cloud-based subscriptions, whether a user identity is changing user or group attributes or permissions, whether a previously-dormant account performs mass downloads, reads configuration settings, etc., whether a previously-dormant account is assigned new attributes or provided access to certain resources, whether the same user identity is enabling dormant users, whether an administrator resets a user account that is logged in by a user identity from the same location, whether an admin elevates privileges of other user accounts beyond their own privileges, resets or updates the password of such user accounts, creates new file paths or access command line interfaces, changes file extensions, etc., and/or whether such user accounts perform mass downloads, read user configuration settings, etc., whether a user identity changes data protection settings, whether a user identity deletes large files, whether a user identity retriggers guest invitation emails, whether a user identity restores deleted administrative accounts, whether a user identity downgrades or changes multi-factor authentication settings for a plurality of user accounts, whether a user identity changes a conditional access policy to report only to specific users, whether a user identity engages in mass device enrollment (or removal) for a new account, whether a user identity changes IP configuration settings, mail forwarding rules, creates/changes certain application programming interfaces, etc., and/or any combination of such behavior.

Figure 4:
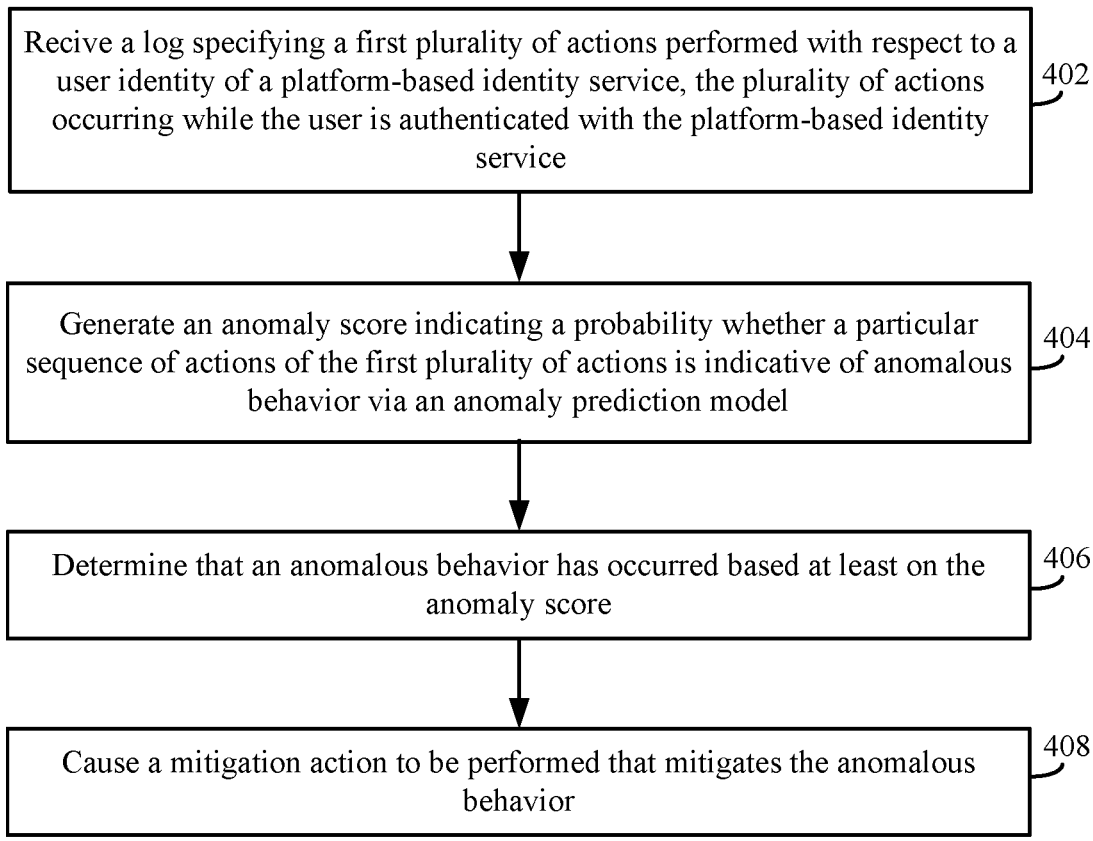
FIG. 4 shows a flowchart of a method for detecting anomalous post-authentication behavior with respect to a user identity in accordance with an example embodiment.

Accordingly, the detection of anomalous post-authentication behavior with respect to a user identity may be implemented in many ways. For example, FIG. 4 shows a flowchart 400 of a method for detecting anomalous post-authentication behavior with respect to a user identity in accordance with an example embodiment. In an embodiment, flowchart 400 may be implemented by user identity protection engine 218 of system 200 shown in FIG. 2, although the method is not limited to that implementation. Accordingly, flowchart 400 will be described with continued reference to FIG. 2. Other structural and operational embodiments will be apparent to persons skilled in the relevant art(s) based on the discussion regarding flowchart 400 and system 200 of FIG. 2.

Flowchart 400 begins with step 402. In step 402, a log specifying a first plurality of actions performed with respect to a user identity of a platform-based identity service is received, where the plurality of actions occurred while the user is authenticated with the platform-based identity service. For example, with reference to FIG. 2, log retriever 202 is configured to receive a subset of audit log(s) 234 (specifying a first plurality of actions that were performed with respect to a user identity of a platform-based identity service) and provides the subset (e.g., audit log(s) 236) to featurizer 204. Featurizer 204 generates feature vector(s) 238 based on the data included in audit log(s) 236 and provides feature vector(s) 238 to anomaly prediction model 206.

In accordance with one or more embodiments, the platform is cloud-based platform, and the platform-based identity service is identity service 128, as described above with reference to FIG. 1. In accordance with one or more other embodiments, the platform may be an enterprise-based platform, an on-premise device, or other types of platforms.

In step 404, an anomaly score is generated that indicates a probability whether a particular sequence of actions of the first plurality of actions is indicative of anomalous behavior via an anomaly prediction model. For example, with reference to FIG. 2, anomaly prediction model 206 generates aggregated anomaly score 212, which indicates a probability whether a particular sequence (e.g., sequence 300, as shown in FIG. 3) of the first plurality of actions is indicative of anomalous behavior. Anomaly prediction model 206 may generate aggregated anomaly score 212 based on feature vector(s) 238. Additional details regarding generating the anomaly score are provided below with reference to FIG. 6.

In step 406, a determination is made that an anomalous behavior has occurred based at least on the anomaly score. For example, with reference to FIG. 2, anomalous behavior determiner 210 determines that anomalous behavior has occurred based at least on aggregated anomaly score 212. Additional details with regards to determining that anomalous behavior has occurred based at least on aggregated anomaly score 212 is described below with reference to FIG. 5.

In step 408, based on determining that the anomalous behavior has occurred, a mitigation action is caused to be performed that mitigates the anomalous behavior. For example, with reference to FIG. 2, anomalous behavior determiner 210 causes a mitigation action to be performed that mitigates the anomalous behavior based on determining that the anomalous behavior has occurred.

In accordance with one or more embodiments, causing the mitigation action to be performed comprises at least one of providing a notification that indicates that the anomalous behavior was detected, causing the user identity to be removed from the platform-based identity service, or causing access to a resource that was previously-accessible by the user identity to be restricted for the user identity. For example, with reference to FIG. 2, anomalous behavior determiner 210 may provide a notification 222 that indicates that the anomalous behavior was detected. In another example, anomalous behavior determiner 210 may provide command 224 (e.g., to identity service 128, as shown in FIG. 1) that instructs identity service 128 to remove the user identity from identity service or that instructs identity service 128 to restrict a resource that was previously-accessible by the user identity.

Figure 5:
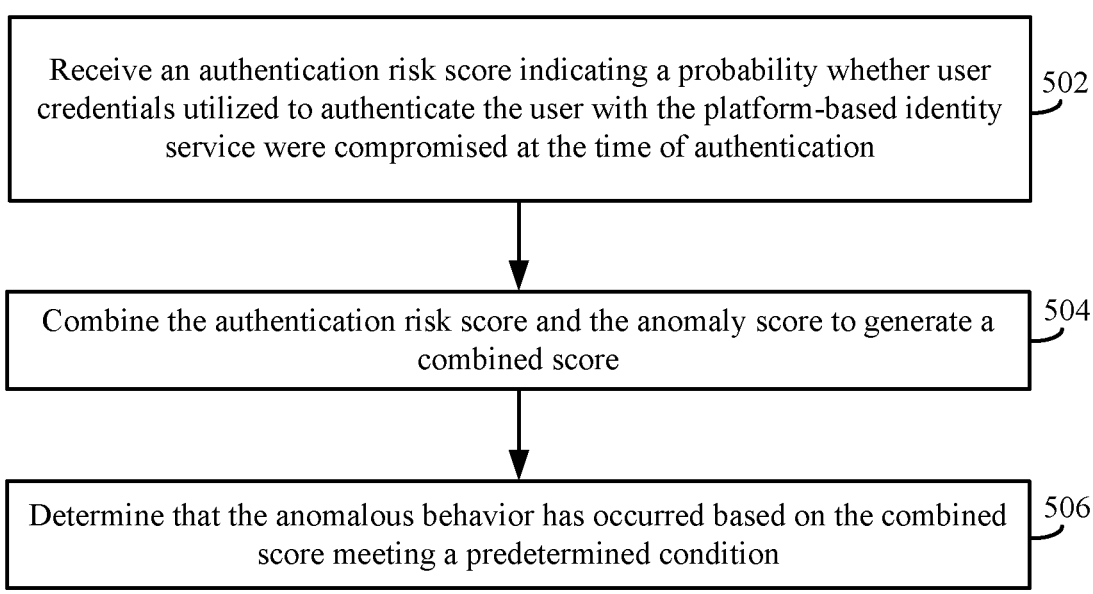
FIG. 5 shows a flowchart of a method for determining that an anomalous behavior has occurred based at least on the anomaly score in accordance with an example embodiment.

FIG. 5 shows a flowchart 500 of a method for determining that an anomalous behavior has occurred based at least on the anomaly score in accordance with an example embodiment. In an embodiment, flowchart 500 may be implemented by user identity protection engine 218 of system 200 shown in FIG. 2, although the method is not limited to that implementation. Accordingly, flowchart 500 will be described with continued reference to FIG. 2. Other structural and operational embodiments will be apparent to persons skilled in the relevant art(s) based on the discussion regarding flowchart 500 and system 200 of FIG. 2.

Flowchart 500 begins with step 502. In step 502, an authentication risk score indicating a probability whether user credentials utilized to authenticate the user with the platform-based identity service were compromised at the time of authentication is received. For example, with reference to FIG. 2, score combiner 208 is configured to receive authentication risk score 214 indicating a probability whether user credentials utilized to authenticate the user with the platform-based identity service (e.g., identity service 128, as shown in FIG. 1) were compromised at the time of authentication.

In step 504, the authentication risk score and anomaly score are combined to generate a combined score. For example, with reference to FIG. 2, score combiner 208 combines (e.g., adds) authentication risk score 214 and aggregated anomaly score 212 to generate a combined score 216.

In step 506, a determination is made that the anomalous behavior has occurred based at least on the combined score meeting a predetermined condition. For example, with reference to FIG. 2, anomalous behavior determiner 210 determines that the anomalous behavior has occurred based on combined score 216 meeting a predetermined condition.

Figure 6:
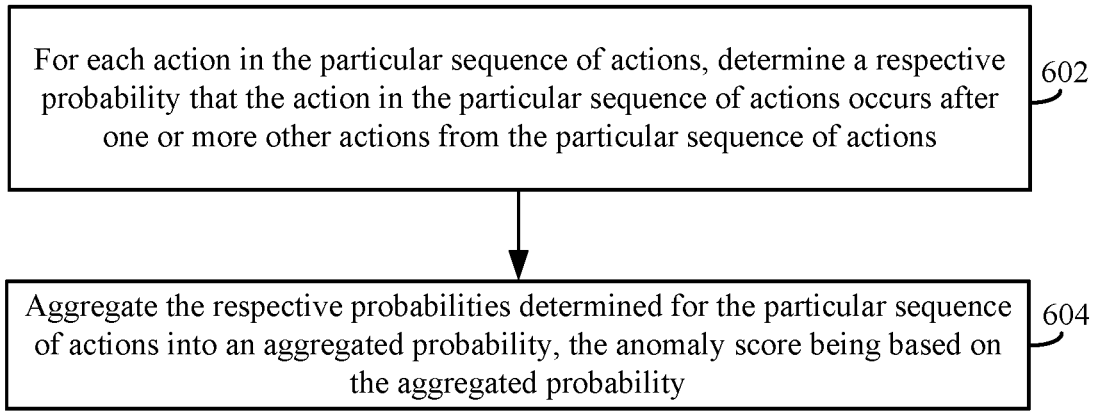
FIG. 6 shows a flowchart of a method for determining an anomaly score in accordance with an example embodiment.

FIG. 6 shows a flowchart 600 of a method for determining an anomaly score in accordance with an example embodiment. In an embodiment, flowchart 600 may be implemented by user identity protection engine 218 of system 200 shown in FIG. 2, although the method is not limited to that implementation. Accordingly, flowchart 600 will be described with continued reference to FIG. 2. Other structural and operational embodiments will be apparent to persons skilled in the relevant art(s) based on the discussion regarding flowchart 600 and system 200 of FIG. 2.

Flowchart 600 begins with step 602. In step 602, for each action in the particular sequence of actions, a respective probability that the action in the particular sequence of actions occurs after one or more other actions from the particular sequence of actions is determined. For example, with reference to FIG. 2, for each action in the particular sequence of actions specified via feature vector(s) 238, anomaly prediction model 206 determines a respective probability that the action in the particular sequence of actions normally occurs (e.g., when no anomalous behavior is present) after one or more other actions from the particular sequence of actions. For instance, with reference to FIG. 3, anomaly prediction model 206 determines a first probability value (0.001) that indicates a probability that action 304 normally occurs after action 302, determines a second probability value (0.01) that indicates a probability that action 306 normally occurs after action 304, and determines a third probability value (0.01) that indicates a probability that action 308 normally occurs after action 306.

In step 604, the respective probabilities determined for the particular sequence of actions are aggregated into an aggregated probability, the anomaly score being based on the aggregated probability. For example, with reference to FIG. 2, anomaly prediction model 206 may aggregate the respective probabilities determined for the particular sequence of actions into an aggregated probability. Aggregated anomaly score 212 is based on the aggregated probability (e.g., aggregated anomaly score 212 is equal to the aggregated probability). Anomaly prediction model 206 may determine aggregated anomaly score 212 in accordance with Equation 1, as described above.

Figure 7:
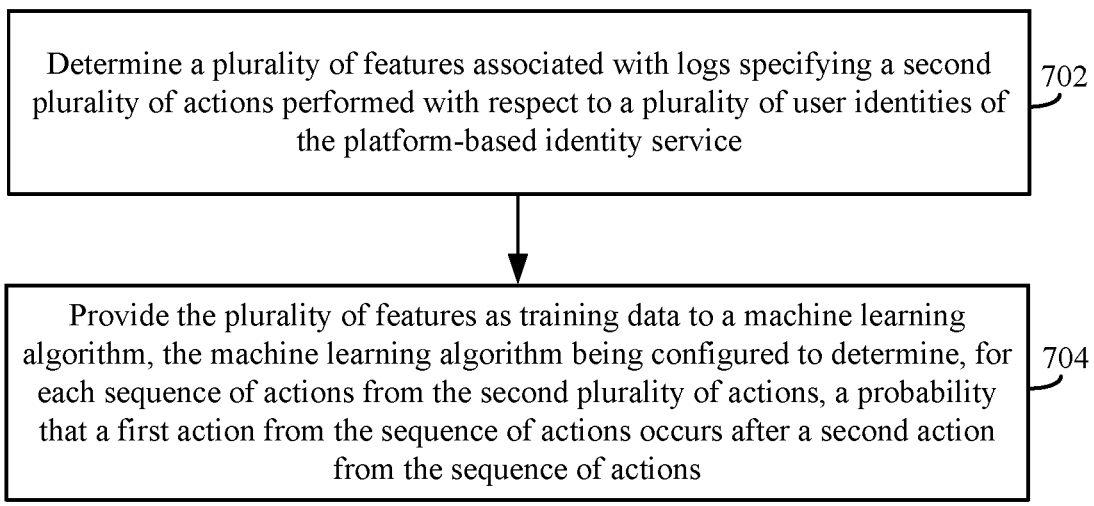
FIG. 7 shows a flowchart of a method for training an anomaly prediction model in accordance with an example embodiment.
Figure 8:
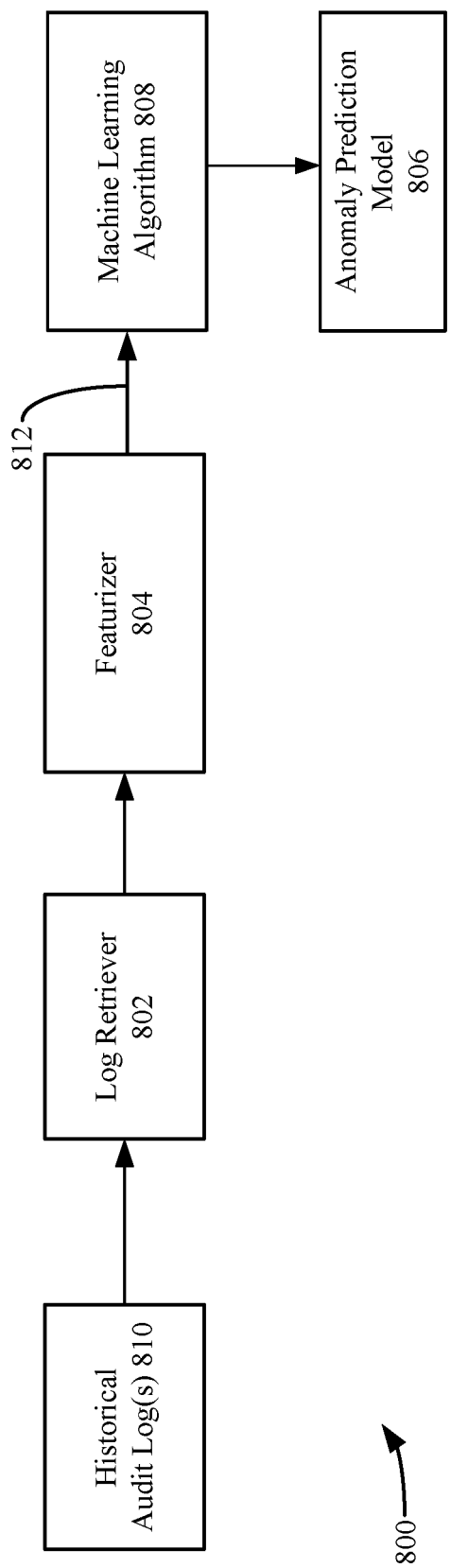
FIG. 8 depicts a block diagram of a system for training an anomaly prediction model in accordance with an example embodiment.

FIG. 7 shows a flowchart 700 of a method for training an anomaly prediction model in accordance with an example embodiment. In an embodiment, flowchart 700 may be implemented by a system 800 as shown in FIG. 8, although the method is not limited to that implementation. FIG. 8 depicts a block diagram of a system 800 for training an anomaly prediction model 806 in accordance with an example embodiment. As shown in FIG. 8, system 800 may comprise a log retriever 802, a featurizer 804, a machine learning algorithm 808, anomaly prediction model 806, and one or more historical audit log(s) 810. Log retriever 802, featurizer 804, and anomaly prediction model 806 are examples of log retriever 202, featurizer 204, and anomaly prediction model 206, as respectively described above with reference to FIG. 2. It is noted that one or more of log retriever 802, featurizer 804, machine learning algorithm 808, and/or anomaly prediction model 806 may be implemented in a user identity protection engine, such as user identity protection engine 218, as described above with reference to FIG. 2. Flowchart 700 will be described with reference to FIG. 8. Other structural and operational embodiments will be apparent to persons skilled in the relevant art(s) based on the discussion regarding flowchart 700 and system 800 of FIG. 8.

Flowchart 700 begins with step 702. In step 702, a plurality of features associated with logs specifying a second plurality of actions performed with respect to a plurality of user identities of the platform-based identity service are determined. For example, with reference with FIG. 8, log retriever 802 is configured to retrieve one or more historical audit logs 810. Historical audit log(s) 810 may be stored in a storage node (e.g., storage node 110B), as shown in FIG. 1. Historical audit log(s) 810 represent audit log(s) (and may be similar to audit log(s) 234, as described above with reference to FIG. 2) that were previously-generated for a plurality of user identities over the course of several days, weeks, months, etc. For each action, audit log(s) 810 may specify an identifier for the action, a time stamp indicating a time at which the action occurred, a network address from which the action was initiated, a user identity that initiated and/or performed the action, etc. Each audit log of historical audit log(s) 810 may store a day's worth of actions. However, the embodiments described herein are not so limited, and each audit log of historical audit log(s) 810 may store multiple days' worth of actions. Historical audit log(s) 810 may be generated by a monitor, such as monitor 132, as described above with reference to FIG. 1. Log retriever 802 provides historical audit log(s) 810 to featurizer 804.

In step 704, the plurality of features is provided as training data to a machine learning algorithm. The machine learning algorithm is configured to determine, for each sequence of actions from the second plurality of actions, a probability that a first action from the sequence of actions occurs after a second action from the sequence of actions. For example, with reference to FIG. 8, featurizer 804 may be configured to extract data from historical audit log(s) 810. The data includes, but is not limited to, an identifier for each action specified by audit log(s) 236, a time stamp indicating a time at which each action occurred, a network address from which each action was initiated, a user identity that initiated and/or performed the action, etc. Featurizer 804 may be also configured to generate one or more feature vectors 812 based on the data extracted from historical audit log(s) 810, which are provided to machine learning algorithm 808. Feature vector(s) 812 generated by featurizer 804 may take any form, such as a numerical, visual and/or textual representation, or may comprise any other form suitable for representing historical audit log(s) 810. In an embodiment, feature vector(s) 812 may include features such as keywords, a total number of words, and/or any other distinguishing aspects relating to historical audit log(s) 810 that may be extracted therefrom. Featurizer 804 may operate in a number of ways to featurize, or generate feature vector(s) 812 for, a given audit log of audit log(s) 236. For example and without limitation, featurizer 804 may featurize a given audit log of historical audit log(s) 810 through time series analysis, keyword featurization, semantic-based featurization, digit count featurization, and/or n-gram-TFIDF featurization.

Machine learning algorithm 808 may be configured to determine relationships between actions performed by user identities (e.g., the likelihood that a particular action occurs after another action for a user identity that does not exhibit anomalous behavior, the likelihood that a particular action occurs after another action for a user identity that exhibits anomalous behavior, etc.) based on an analysis of feature vector(s) 812. Machine learning algorithm 808 may utilize an n-gram (e.g., 2-gram) probability-based technique to determine the probabilities of transitions between different actions in any given sequence of actions specified via feature vector(s) 812. Machine learning algorithm 808 may be an unsupervised machine learning algorithm or a neural network-based machine learning algorithm (e.g., a recurrent neural network (RNN)-based machine learning algorithm, such as, but not limited to a long short-term memory (LSTM)-based machine learning algorithm). Utilizing the foregoing techniques, machine learning algorithm 808 generates anomaly prediction model 806, which may be utilized to generate an anomaly score, as described above with reference to FIG. 2.

III. Example Computer System Implementation

The systems and methods described above in reference to FIGS. 1-8, may be implemented in hardware, or hardware combined with one or both of software and/or firmware. For example, system 900 may be used to implement any of nodes 108A-108N, 112A-112N, and/or 114A-114N, storage node(s) 110A-110N, user identity protection engine 118, monitor 132, authentication assessment engine 120, and identity service 128 of FIG. 1, user identity protection engine 218, authentication assessment engine 220, log retriever 202, featurizer 204, anomaly prediction model 206, score combiner 208, and/or anomalous behavior determiner 210 of FIG. 2, log retriever 802, featurizer 804, machine learning algorithm 808, and/or anomaly prediction model 806 of FIG. 8, and/or any of the components respectively described therein, and flowcharts 400, 500, 600, and/or 700 may be each implemented as computer program code/instructions configured to be executed in one or more processors and stored in a computer readable storage medium. Alternatively, any of nodes 108A-108N, 112A-112N, and/or 114A-114N, storage node(s) 110A-110N, user identity protection engine 118, monitor 132, authentication assessment engine 120, and identity service 128 of FIG. 1, user identity protection engine 218, authentication assessment engine 220, log retriever 202, featurizer 204, anomaly prediction model 206, score combiner 208, and/or anomalous behavior determiner 210 of FIG. 2, log retriever 802, featurizer 804, machine learning algorithm 808, and/or anomaly prediction model 806 of FIG. 8, and/or any of the components respectively described therein, and flowcharts 400, 500, 600, and/or 700 may be implemented as hardware logic/electrical circuitry. In an embodiment, any of nodes 108A-108N, 112A-112N, and/or 114A-114N, storage node(s) 110A-110N, user identity protection engine 118, monitor 132, authentication assessment engine 120, and identity service 128 of FIG. 1, user identity protection engine 218, authentication assessment engine 220, log retriever 202, featurizer 204, anomaly prediction model 206, score combiner 208, and/or anomalous behavior determiner 210 of FIG. 2, log retriever 802, featurizer 804, machine learning algorithm 808, and/or anomaly prediction model 806 of FIG. 8, and/or any of the components respectively described therein, and flowcharts 400, 500, 600, and/or 700 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 9:
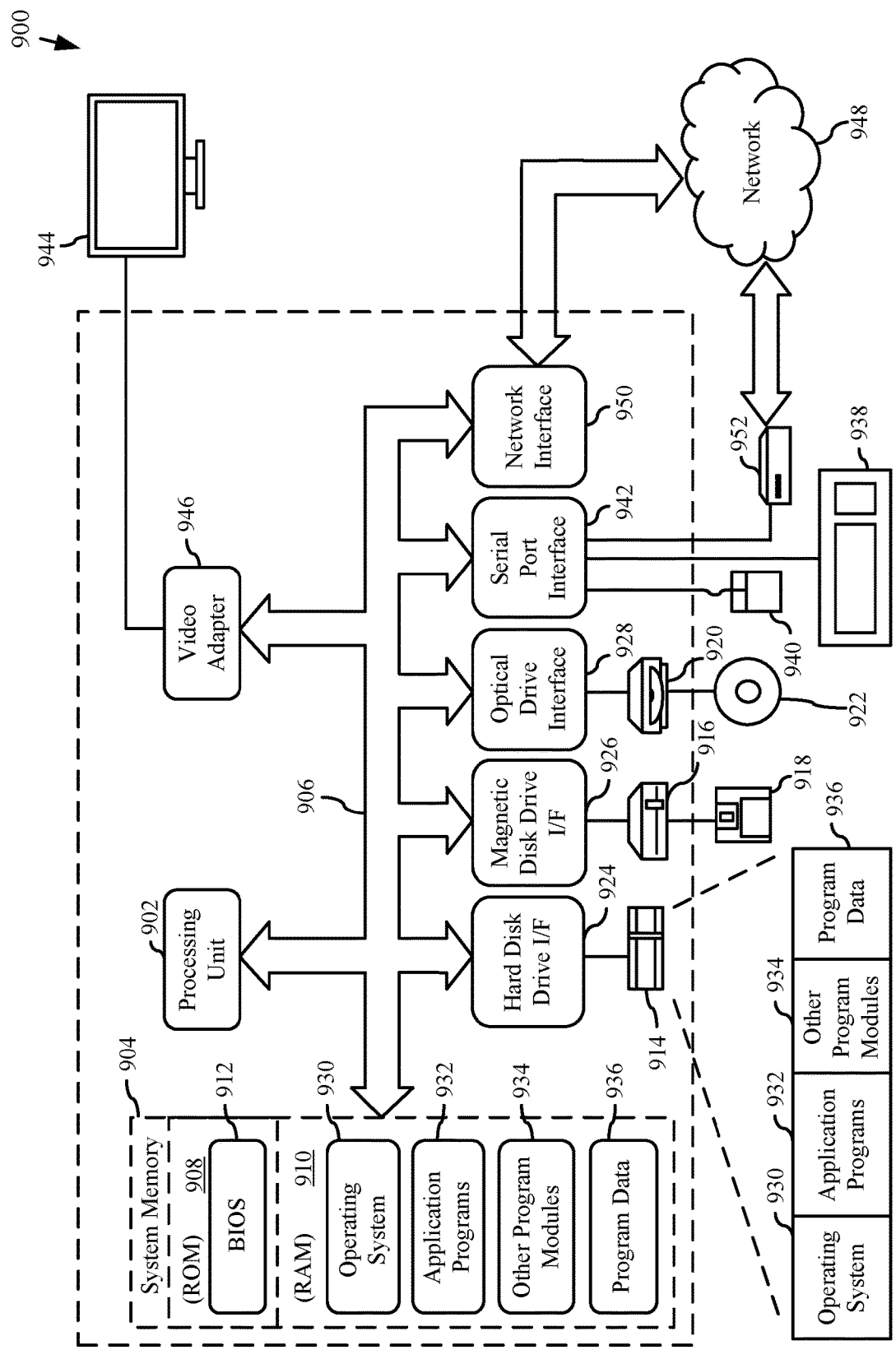
FIG. 9 is a block diagram of an example processor-based computer system that may be used to implement various embodiments.

FIG. 9 depicts an exemplary implementation of a computing device 900 in which embodiments may be implemented, including any of nodes 108A-108N, 112A-112N, and/or 114A-114N, storage node(s) 110A-110N, user identity protection engine 118, monitor 132, authentication assessment engine 120, and identity service 128 of FIG. 1, user identity protection engine 218, authentication assessment engine 220, log retriever 202, featurizer 204, anomaly prediction model 206, score combiner 208, and/or anomalous behavior determiner 210 of FIG. 2, log retriever 802, featurizer 804, machine learning algorithm 808, and/or anomaly prediction model 806 of FIG. 8, and/or any of the components respectively described therein, and flowcharts 400, 500, 600, and/or 700. The description of computing device 900 provided herein is provided for purposes of illustration, and is not intended to be limiting. Embodiments may be implemented in further types of computer systems, as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing the systems described above, including the embodiments described above with reference to FIGS. 1-8.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, a virtual keyboard, by providing a tap input (where a user lightly presses and quickly releases display screen 944), by providing a "touch-and-hold" input (where a user touches and holds his finger (or touch instrument) on display screen 944 for a predetermined period of time), by providing touch input that exceeds a predetermined pressure threshold, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium" are used to generally refer to physical hardware media such as the hard disk associated with hard disk drive 914, removable magnetic disk 918, removable optical disk 922, other physical hardware media such as RAMs, ROMs, flash memory cards, digital video disks, zip disks, MEMs, nanotechnology-based storage devices, and further types of physical/tangible hardware storage media (including system memory 904 of FIG. 9). Such computer-readable storage media are distinguished from and non-overlapping with communication media and propagating signals (do not include communication media and propagating signals). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 952, or any other interface type. Such computer programs, when executed or loaded by an application, enable computing device 900 to implement features of embodiments discussed herein. Accordingly, such computer programs represent controllers of the computing device 900.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Further Example Embodiments

A computer system is described herein. The computer system includes: at least one processor circuit; and at least one memory that stores program code configured to be executed by the at least one processor circuit, the program code comprising: a user identity protection engine configured to: receive a log specifying a first plurality of actions performed with respect to a user identity of a platform-based identity service, the plurality of actions occurring while the user is authenticated with the platform-based identity service; generate an anomaly score indicating a probability whether a particular sequence of actions of the first plurality of actions is indicative of anomalous behavior via an anomaly prediction model; determine that an anomalous behavior has occurred based at least on the anomaly score; and based on a determination that the anomalous behavior has occurred, cause a mitigation action to be performed that mitigates the anomalous behavior.

In one implementation of the foregoing computer system, the user identity protection engine is further configured to: receive an authentication risk score indicating a probability whether user credentials utilized to authenticate the user with the platform-based identity service were compromised at the time of authentication; combine the authentication risk score and the anomaly score to generate a combined score; and determine that the anomalous behavior has occurred based on the combined score meeting a predetermined condition.

In one implementation of the foregoing computer system, the user identity protection engine is further configured to: for each action in the particular sequence of actions, determine a respective probability that the action in the particular sequence of actions occurs after one or more other actions from the particular sequence of actions; and aggregate the respective probabilities determined for the particular sequence of actions into an aggregated probability, the anomaly score being based on the aggregated probability.

In one implementation of the foregoing computer system, the anomaly prediction model comprises a machine learning model, wherein the machine learning model comprises at least one of: an unsupervised machine learning-based model; or a neural network-based machine learning-based model.

In one implementation of the foregoing computer system, the machine learning model is trained by: determining a plurality of features associated with logs specifying a second plurality of actions performed with respect to a plurality of user identities of the platform-based identity service; and providing the plurality of features as training data to a machine learning algorithm, wherein the machine learning algorithm is configured to determine, for each sequence of actions from the second plurality of actions, a probability that a first action from the sequence of actions occurs after a second action from the sequence of actions.

In one implementation of the foregoing computer system, the plurality of features comprises at least one of: a respective identifier for each of the second plurality of actions; a respective time stamp indicating a time at which a respective action of the second plurality of actions occurred; or a respective network address from which a respective action from the second plurality of actions was initiated.

In one implementation of the foregoing computer system, the user identity protection engine is further configured to perform at least one of: provide a notification that indicates that the anomalous behavior was detected; cause the user identity to be removed from the platform-based identity service; or cause access to a resource that was previously-accessible by the user identity to be restricted for the user identity.

A method performed by a computing system is also disclosed. The method includes: receiving a log specifying a first plurality of actions performed with respect to a user identity of a platform-based identity service, the plurality of actions occurring while the user is authenticated with the platform-based identity service; generating an anomaly score indicating a probability whether a particular sequence of actions of the first plurality of actions is indicative of anomalous behavior via an anomaly prediction model; determining that an anomalous behavior has occurred based at least on the anomaly score; and based on determining that the anomalous behavior has occurred, causing a mitigation action to be performed that mitigates the anomalous behavior.

In one implementation of the foregoing method, the method further comprises: receiving an authentication risk score indicating a probability whether user credentials utilized to authenticate the user with the platform-based identity service were compromised at the time of authentication; combining the authentication risk score and the anomaly score to generate a combined score; and determining that the anomalous behavior has occurred based on the combined score meeting a predetermined condition.

In one implementation of the foregoing method, generating the anomaly score comprises: for each action in the particular sequence of actions, determining a respective probability that the action in the particular sequence of actions occurs after one or more other actions from the particular sequence of actions; and aggregating the respective probabilities determined for the particular sequence of actions into an aggregated probability, the anomaly score being based on the aggregated probability.

In one implementation of the foregoing method, the anomaly prediction model comprises a machine learning model, wherein the machine learning model comprises at least one of: an unsupervised machine learning-based model; or a neural network-based machine learning-based model.

In one implementation of the foregoing method, the machine learning model is trained by: determining a plurality of features associated with logs specifying a second plurality of actions performed with respect to a plurality of user identities of the platform-based identity service; and providing the plurality of features as training data to a machine learning algorithm, wherein the machine learning algorithm is configured to determine, for each sequence of actions from the second plurality of actions, a probability that a first action from the sequence of actions occurs after a second action from the sequence of actions.

In one implementation of the foregoing method, the plurality of features comprises at least one of: a respective identifier for each of the second plurality of actions; a respective time stamp indicating a time at which a respective action of the second plurality of actions occurred; or a respective network address from which a respective action from the second plurality of actions was initiated.

In one implementation of the foregoing method, causing the mitigation action to be performed that mitigates the anomalous behavior comprises at least one of: providing a notification that indicates that the anomalous behavior was detected; causing the user identity to be removed from the platform-based identity service; or causing access to a resource that was previously-accessible by the user identity to be restricted for the user identity.

A computer-readable storage medium having program instructions recorded thereon that, when executed by at least one processor of a computing system, perform a method. The method includes: receiving a log specifying a first plurality of actions performed with respect to a user identity of a platform-based identity service, the plurality of actions occurring while the user is authenticated with the platform-based identity service; generating an anomaly score indicating a probability whether a particular sequence of actions of the first plurality of actions is indicative of anomalous behavior via an anomaly prediction model; determining that an anomalous behavior has occurred based at least on the anomaly score; and based on determining that the anomalous behavior has occurred, causing a mitigation action to be performed that mitigates the anomalous behavior.

In one implementation of the foregoing computer-readable storage medium, receiving an authentication risk score indicating a probability whether user credentials utilized to authenticate the user with the platform-based identity service were compromised at the time of authentication; combining the authentication risk score and the anomaly score to generate a combined score; and determining that the anomalous behavior has occurred based on the combined score meeting a predetermined condition.

In one implementation of the foregoing computer-readable storage medium, generating the anomaly score comprises: for each action in the particular sequence of actions, determining a respective probability that the action in the particular sequence of actions occurs after one or more other actions from the particular sequence of actions; and aggregating the respective probabilities determined for the particular sequence of actions into an aggregated probability, the anomaly score being based on the aggregated probability.

In one implementation of the foregoing computer-readable storage medium, the anomaly prediction model comprises a machine learning model, wherein the machine learning model comprises at least one of: an unsupervised machine learning-based model; or a neural network-based machine learning-based model.

In one implementation of the foregoing computer-readable storage medium, the machine learning model is trained by: determining a plurality of features associated with logs specifying a second plurality of actions performed with respect to a plurality of user identities of the platform-based identity service; and providing the plurality of features as training data to a machine learning algorithm, wherein the machine learning algorithm is configured to determine, for each sequence of actions from the second plurality of actions, a probability that a first action from the sequence of actions occurs after a second action from the sequence of actions.

In one implementation of the foregoing computer-readable storage medium, the plurality of features comprises at least one of: a respective identifier for each of the second plurality of actions; a respective time stamp indicating a time at which a respective action of the second plurality of actions occurred; or a respective network address from which a respective action from the second plurality of actions was initiated.

V. Conclusion

While various example embodiments have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosure should not be limited by any of the above-described example embodiments, but should be defined only in accordance with the following claims and their equivalents.

What is claimed is:

1. A computing system, comprising:
at least one processor circuit; and
at least one memory that stores program code configured to be executed by the at least one processor circuit, the program code comprising:
  a user identity protection engine configured to:
    receive a log specifying a sequence of actions performed with respect to a user identity of a platform-based identity service, the sequence of actions occurring while the user identity is authenticated with the platform-based identity service;
    generate an anomaly score indicating a probability whether the sequence of actions is indicative of anomalous behavior via an anomaly prediction model;
    receive an authentication risk score indicating a probability whether user credentials utilized to authenticate the user identity with the platform-based identity service were compromised at the time of authentication;
    combine the authentication risk score and the anomaly score to generate a combined score;
    determine that an anomalous behavior has occurred based at least on the combined score; and
    based on a determination that the anomalous behavior has occurred, cause a mitigation action to be performed that mitigates the anomalous behavior.

2. The computing system of claim 1, wherein the user identity protection engine is further configured to:
determine that the anomalous behavior has occurred based on the combined score meeting a predetermined condition.

3. The computing system of claim 1, wherein the user identity protection engine is further configured to:
for each action in the sequence of actions, determine a respective probability that the action occurs after one or more other actions from the sequence of actions; and
aggregate the respective probabilities determined for the sequence of actions into an aggregated probability, the anomaly score being based on the aggregated probability.

4. The computing system of claim 1, wherein the anomaly prediction model comprises a machine learning model, wherein the machine learning model comprises at least one of:
an unsupervised machine learning-based model; or
a neural network-based machine learning-based model.

5. The computing system of claim 4, wherein the machine learning model is trained by:
determining a plurality of features associated with logs specifying a plurality of actions performed with respect to a plurality of user identities of the platform-based identity service; and
providing the plurality of features as training data to a machine learning algorithm, wherein the machine learning algorithm is configured to determine, for each sequence of actions from the plurality of actions, a probability that a first action from the sequence of actions occurs after a second action from the sequence of actions.

6. The computing system of claim 5, wherein the plurality of features comprises at least one of:

a respective identifier for each of the plurality of actions;
a respective time stamp indicating a time at which a respective action of the plurality of actions occurred; or
a respective network address from which a respective action from the plurality of actions was initiated.

7. The computing system of claim 1, wherein the user identity protection engine is further configured to perform at least one of:
provide a notification that indicates that the anomalous behavior was detected;
cause the user identity to be removed from the platform-based identity service; or
cause access to a resource that was previously-accessible by the user identity to be restricted for the user identity.

8. A method performed by a computing system, comprising:
receiving a log specifying a sequence of actions performed with respect to a user identity of a platform-based identity service, the sequence of actions occurring while the user identity is authenticated with the platform-based identity service;
generating an anomaly score indicating a probability whether the sequence of actions is indicative of anomalous behavior via an anomaly prediction model;
receiving an authentication risk score indicating a probability whether user credentials utilized to authenticate the user identity with the platform-based identity service were compromised at the time of authentication;
combining the authentication risk score and the anomaly score to generate a combined score;
determining that an anomalous behavior has occurred based at least on the combined score; and
based on determining that the anomalous behavior has occurred, causing a mitigation action to be performed that mitigates the anomalous behavior.

9. The method of claim 8, further comprising:
determining that the anomalous behavior has occurred based on the combined score meeting a predetermined condition.

10. The method of claim 8, wherein generating the anomaly score comprises:
for each action in the sequence of actions, determining a respective probability that the action occurs after one or more other actions from the sequence of actions; and
aggregating the respective probabilities determined for the sequence of actions into an aggregated probability, the anomaly score being based on the aggregated probability.

11. The method of claim 8, wherein the anomaly prediction model comprises a machine learning model, wherein the machine learning model comprises at least one of:
an unsupervised machine learning-based model; or
a neural network-based machine learning-based model.

12. The method of claim 11, wherein the machine learning model is trained by:
determining a plurality of features associated with logs specifying a plurality of actions performed with respect to a plurality of user identities of the platform-based identity service; and
providing the plurality of features as training data to a machine learning algorithm, wherein the machine learning algorithm is configured to determine, for each sequence of actions from the plurality of actions, a probability that a first action from the sequence of actions occurs after a second action from the sequence of actions.

13. The method of claim 12, wherein the plurality of features comprises at least one of:
a respective identifier for each of the plurality of actions;
a respective time stamp indicating a time at which a respective action of the plurality of actions occurred; or
a respective network address from which a respective action from the plurality of actions was initiated.

14. The method of claim 8, wherein causing the mitigation action to be performed that mitigates the anomalous behavior comprises at least one of:
providing a notification that indicates that the anomalous behavior was detected;
causing the user identity to be removed from the platform-based identity service; or
causing access to a resource that was previously-accessible by the user identity to be restricted for the user identity.

15. A computer-readable storage medium having program instructions recorded thereon that, when executed by at least one processor of a computing system, perform a method, the method comprising:
receiving a log specifying a sequence of actions performed with respect to a user identity of a platform-based identity service, the sequence of actions occurring while the user identity is authenticated with the platform-based identity service;
generating an anomaly score indicating a probability whether the sequence of actions is indicative of anomalous behavior via an anomaly prediction model;
receiving an authentication risk score indicating a probability whether user credentials utilized to authenticate the user identity with the platform-based identity service were compromised at the time of authentication;
combining the authentication risk score and the anomaly score to generate a combined score;
determining that an anomalous behavior has occurred based at least on the combined score; and
based on determining that the anomalous behavior has occurred, causing a mitigation action to be performed that mitigates the anomalous behavior.

16. The computer-readable storage medium of claim 15, further comprising:
determining that the anomalous behavior has occurred based on the combined score meeting a predetermined condition.

17. The computer-readable storage medium of claim 15, wherein generating the anomaly score comprises:
for each action in the sequence of actions, determining a respective probability that the action occurs after one or more other actions from the sequence of actions; and
aggregating the respective probabilities determined for the sequence of actions into an aggregated probability, the anomaly score being based on the aggregated probability.

18. The computer-readable storage medium of claim 15, wherein the anomaly prediction model comprises a machine learning model, wherein the machine learning model comprises at least one of:
an unsupervised machine learning-based model; or
a neural network-based machine learning-based model.

19. The computer-readable storage medium of claim 18, wherein the machine learning model is trained by:
determining a plurality of features associated with logs specifying a plurality of actions performed with respect to a plurality of user identities of the platform-based identity service; and providing the plurality of features as training data to a machine learning algorithm, wherein the machine learning algorithm is configured to determine, for each sequence of actions from the plurality of actions, a probability that a first action from the sequence of actions occurs after a second action from the sequence of actions.

20. The computer-readable storage medium of claim 19, wherein the plurality of features comprises at least one of:
a respective identifier for each of the plurality of actions;
a respective time stamp indicating a time at which a respective action of the plurality of actions occurred; or
a respective network address from which a respective action from the plurality of actions was initiated.

* * * * *